United States Patent
Smith et al.

(10) Patent No.: US 6,669,312 B2
(45) Date of Patent: Dec. 30, 2003

(54) TRACKED VEHICLES, AND ENDLESS TRACKS AND WHEELS THEREFORE

(75) Inventors: Eric Brian Smith, Independence, IA (US); Craig Edward Rehmert, Jesup, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/003,894

(22) Filed: Oct. 25, 2001

(65) Prior Publication Data

US 2003/0080617 A1 May 1, 2003

(51) Int. Cl.$^7$ ................................................. B62D 55/14
(52) U.S. Cl. ........................ 305/136; 152/393; 152/398
(58) Field of Search .............................. 305/136, 137, 305/195, 199; 152/393, 394, 396, 397, 398, 402, 323, 395; 301/9.1, 23, 24

(56) References Cited

U.S. PATENT DOCUMENTS

| | | | |
|---|---|---|---|
| 467,769 A | * | 1/1892 | Challiner |
| 615,059 A | * | 11/1898 | Davidson |
| 668,384 A | * | 2/1901 | Morgan |
| 902,009 A | * | 10/1908 | Stall, Jr. |
| 908,475 A | * | 1/1909 | Midgley et al. |
| 1,009,529 A | * | 11/1911 | Koken |
| 1,117,134 A | | 11/1914 | Koken |
| 1,216,474 A | | 2/1917 | Lindsay |
| 1,230,616 A | | 6/1917 | Stevenson |
| 1,287,682 A | * | 12/1918 | Harloe |
| 1,336,130 A | | 4/1920 | Christie |
| 1,359,149 A | * | 11/1920 | Bliss |
| 1,365,350 A | * | 1/1921 | Sloper |
| 1,669,731 A | * | 5/1928 | Ash |
| 1,804,470 A | | 5/1931 | Knox |
| 1,814,623 A | * | 7/1931 | Finnell |
| 1,838,164 A | * | 12/1931 | Tannewitz |
| 2,233,562 A | * | 3/1941 | Tannewitz |
| 2,764,213 A | * | 9/1956 | Simpson |
| 2,970,867 A | * | 2/1961 | Ruf |
| 2,992,863 A | | 7/1961 | Fredricks et al. .............. 305/57 |
| 3,797,895 A | * | 3/1974 | Tomizawa .................. 305/136 |
| 3,871,719 A | * | 3/1975 | Boggs ........................ 305/136 |
| 3,996,810 A | * | 12/1976 | Groff .......................... 305/136 |
| 4,235,270 A | | 11/1980 | Kahaner et al. ................ 152/7 |
| 4,457,388 A | | 7/1984 | Koehler et al. ............ 180/9.48 |
| 4,560,018 A | | 12/1985 | Satzler ........................ 180/9.1 |
| 5,131,731 A | | 7/1992 | Johnson ....................... 305/56 |
| 5,161,866 A | | 11/1992 | Johnson ....................... 305/24 |
| 5,288,143 A | | 2/1994 | Dester et al. ................. 305/56 |
| 5,302,012 A | | 4/1994 | Dester et al. ................. 305/56 |
| 5,368,115 A | | 11/1994 | Crabb ........................ 180/9.1 |

FOREIGN PATENT DOCUMENTS

DE        26 17 342        11/1977

* cited by examiner

*Primary Examiner*—Russell D. Stormer
(74) *Attorney, Agent, or Firm*—Wilhelm Law Service; Thomas D. Wilhelm

(57) ABSTRACT

A wheel assembly comprises a tire supported by an underlying wheel. The tire has inner and outer surfaces, first and second side surfaces, and first and second recesses. Cables are in the tire proximate the inner surface. The wheel has inner and outer flanges, and an outer surface. The outer surface of the wheel receives the inner surface of the tire. The outer surface of the outer flange has lesser and greater diameter portions extending from respective sides. The lesser diameter portion covers at least 60 percent of the width of the outer surface. The greater diameter portion, defines a side flange, integral with the outer flange. A second side flange is removably mounted to the outer flange. The side flanges comprise side-facing abutment surfaces which interface with side-facing surfaces on the tire. The difference between the lesser and greater diameters is greater than radial stretch capability of the tire.

24 Claims, 2 Drawing Sheets

TRACKED VEHICLES, AND ENDLESS TRACKS AND WHEELS THEREFORE

BACKGROUND

This invention relates generally to wheel assemblies, and especially to wheel assemblies which are employed in ground-engaging drive systems which are used in e.g. tracked vehicles and in endless belt conveyors. While the disclosure herein focuses on tracked vehicles and endless track drive systems for such vehicles, it will be understood that the invention can be employed in other endless track drive systems.

Ground-engaging endless track drive systems in tracked vehicles employ a plurality of wheel assemblies to define a track path, which path is beneficially traversed by the track in causing the vehicle to move along the ground. Such track drive systems can include, for example and without limitation, on each side of the vehicle, a drive wheel assembly disposed adjacent e.g. the rear of the vehicle, an idler wheel assembly disposed adjacent e.g. the front of the vehicle, and one or more mid-roller wheel assemblies backing up the ground-engaging surface of the track between the drive wheel assembly and the idler wheel assembly.

In some embodiments, such track systems employ, as an additional element, one or more separate and distinct tensioning wheel assemblies in e.g. an upper portion of the track path. In other embodiments, the tensioning function is integrated into the operation of one or more of the other wheel assemblies, as a secondary function in addition to the primary function of the respective wheel assembly.

The structures of the several wheel assemblies are typically designed and configured according to the specific uses for which each such wheel assembly is to be employed. Accordingly, drive wheel assemblies are structured for their driving function.

Idler wheel assemblies are structured for their function of performing a significant angle turn of the track, and typically are structured to perform or assist with functions related to steering the direction of movement of the vehicle. Since the idler wheel assembly generally does not bear the stresses of driving the vehicle, on a given vehicle, the idler wheel assemblies are typically less complex, and may be less robust, than the drive wheel assemblies.

Mid-roller wheel assemblies are structured and mounted to provide downwardly-directed support of the underlying track, and thus can be spring loaded from the frame for such support of the endless track. Mid-roller wheel assemblies generally do not perform driving or steering functions.

Similarly, tensioning wheel assemblies, not shown in the drawings, are structured for typically upwardly-directed support of the track, and thus are also typically designed to be spring loaded from the frame. As with mid-roller wheel assemblies, tensioning wheel assemblies generally do not perform driving or steering functions.

Thus, while the drive wheel assemblies and the idler wheel assemblies, which perform driving and steering functions, are typically relatively more robust, and can be more complex, mid-roller wheel assemblies and tensioning wheel assemblies typically perform less demanding functions and thus can be somewhat less robust and may be simpler in design.

Wheel assemblies used in track drive systems typically employ an outer layer of elastomeric material, such as rubber, as an outer driving surface. Such elastomeric layer is resilient, thus providing at least some cushioning of the vehicle frame from the rough terrain over which such vehicles may be operated. In addition, the rubber outer surface generates less noise against the track than does a metal outer surface of the wheel assembly. Yet further, the elastomeric, e.g. rubber, outer surface of the wheel assembly has a higher coefficient of friction than commonly available metal, whereby friction driving of the track is facilitated.

The elastomeric layer of the wheel assembly is typically mounted to a metal wheel, which is mounted to a wheel hub, the hub being mounted to a respective axle or other mounting shaft. Various structures have been proposed for such mounting of the elastomeric layer to the wheel. There are available, for example, as conventional structures, entrapping flanges integral with the wheel wherein the flanges extend outwardly of, and partially overlie, the outer surface of the elastomeric layer, such that the flanges interfere with interface of the elastomeric surface with a track having an inner surface which is generally flat when taken across the transverse dimension of the track.

Another conventional structure includes a coiled metal spring as an outer track-engaging surface of the wheel assembly, held in place by a separate side flange which extends upwardly above the track-engaging outer surface of the wheel assembly.

Yet another conventional structure teaches spacer sleeves extending through, and apparently molded into, the elastomeric tire material and receiving bolts which extend between retaining rings on opposing sides of the tire, and wheel, through the spacer sleeves, thereby to hold the tire to the wheel.

All the above structures are quite complex, including associated cost, both of manufacturing such structures and of maintaining such structures.

In a known simpler design, for mid-roller wheel assemblies, a non-pneumatic rubber tire is adhesively mounted to an outer surface of a wheel, thereby to provide a relatively low cost wheel assembly. The wheel has an outer surface which receives the inner surface of the tire. Such adhesively-mounted tire can separate from the wheel under the severe operating conditions in which such vehicles are commonly used; and such separation requires replacement of both the tire and the hub.

It is an object of this invention to provide a relatively less complex wheel assembly wherein a relatively less complex elastomeric tire is mounted to a generally less complex wheel.

It is another object to provide such wheel assembly wherein the tire can be replaced without replacing the wheel.

It is still another object to provide such wheel assembly wherein the tire is held on the wheel by a side flange mounted to the wheel, and wherein no portion of the mounting structure passes through the tire so as to require an aperture extending transversely through the tire, outside the inner surface of the tire.

Still another object is to provide such wheel assembly wherein tire defines the entirety of the width of the outer surface of the wheel assembly.

SUMMARY

This invention contemplates a wheel assembly for use in an endless track drive system. The wheel assembly comprises a tire comprising a tire body. The tire body comprises elastomeric material composition. Structurally, the tire body comprises a tire exterior. The tire exterior comprises an inner surface, an outer surface, first and second respective side surfaces extending generally from the outer surface toward the inner surface, and first and second recesses in the exterior of the tire body between the inner surface and respective ones of the side surfaces. The first and second recesses each define a side-facing recess surface thereof. The tire body further comprises a plurality of cables proximate the inner surface of the tire body, embedded in and surrounded by the elastomeric material, the cables in combination limiting radial stretching of the tire.

The wheel assembly further comprises a wheel having an inner flange defining a central opening for mounting the wheel to an axle through a wheel hub, for rotation of the wheel and hub with respect to such axle, and an outer flange having first and second opposing sides, and an outer surface corresponding to an outer surface of the wheel. The outer surface of the wheel receives the inner surface of the tire thereon at a wheel-tire interface. The inner surface of the tire and the outer surface of the wheel are cooperatively sized and configured such that the tire can be mounted on the wheel with a snug fit. The outer surface of the outer flange comprises a first lesser diameter portion extending from the first side of the wheel toward the second opposing side, along at least 60 percent, preferably at least 70 percent, more preferably at least 80 percent, of the width of the wheel between the first and second side edges. The lesser diameter surface portion has a first lesser diameter. The outer surface of the wheel further comprises a second greater diameter portion, which comprises a first side flange at the second side, integral with the outer flange of the wheel. The first side flange has a second diameter greater than the first diameter, and comprises a first abutment surface facing toward a center of the outer surface and abutting the side-facing recess surface of the first recess in the tire. A web connects the inner flange of the wheel to the outer flange of the wheel.

As a separate and distinct element, the wheel assembly comprises a second side flange disposed against the second side of the outer flange of the wheel. A second abutment surface on the second side flange faces toward the center of the outer surface of the outer flange. The second side flange is removably mounted to the outer flange of the wheel by fasteners. The second abutment surface abuts the side-facing recess surface of the second recess in the exterior of the tire.

The difference between the magnitudes of the first and second diameters is greater than the radial stretch capability of the combination of the cables and the elastomeric material forming the tire, thereby to prevent transverse movement of the tire off the wheel while the second side flange is mounted to the wheel.

In preferred embodiments, the cables are steel cables.

Also in preferred embodiments, the outer surface of the tire defines the entirety of an outer surface of the wheel assembly.

Further to preferred embodiments, the tire is free from fasteners passing therethrough for affixation of the tire to the wheel.

Still further to preferred embodiments, the wheel assembly is free from adhesive at the wheel-tire interface.

Yet further to preferred embodiments, the second side flange comprises an annular body having apertures therein, receiving fasteners removably affixing the annular body to the first side of the outer flange, and an annular top leg extending from the annular body toward a central portion of the outer surface of the outer flange, between the outer surface of the outer flange and the inner surface of the elastomeric tire at the second recess. The fasteners preferably extend through the apertures in the second side flange and into preferably blind apertures in the side of the outer flange of the wheel.

In preferred embodiments, the outer flange has a relatively greater first width between a center-line, extending through and centered along the wheel web perpendicular to the lesser diameter portion, and the second side edge at the first side flange, and a relatively lesser second width between the center-line and the first side edge.

Yet in preferred embodiments, the combination of the second width of the outer flange, plus a width of the second side flange, is approximately equal to the first width.

Preferred material for the elastomeric material in the tire comprises a rubber compound.

In preferred embodiments, the first and second abutment surfaces form angles "α", with the lesser diameter portion of the outer surface of the outer flange of no more than about 135 degrees. A leg of each such angle "α" is disposed between the respective abutment surface and the center of the outer surface of the outer flange.

The invention further comprises an endless track drive system, comprising a prime mover such as an internal combustion engine or an electric motor, an endless track mounted about a plurality of wheel assemblies defining a path therefore, and a drive train transferring drive power from the prime mover to at least one of the wheel assemblies, at least one of the plurality of wheel assemblies comprising a wheel assembly as described above.

The invention also contemplates a tracked vehicle comprising a frame, a prime mover, a track assembly, and a drive train transferring drive power from the prime mover to the track assembly, the track assembly comprising an endless track and a plurality of wheel assemblies about which the endless track is mounted, including at least one of the wheel assemblies as described above.

Wheel assemblies of the invention are preferably used as mid-wheel rollers, idler wheel assemblies, and/or tensioning wheel assemblies.

Figure 1:
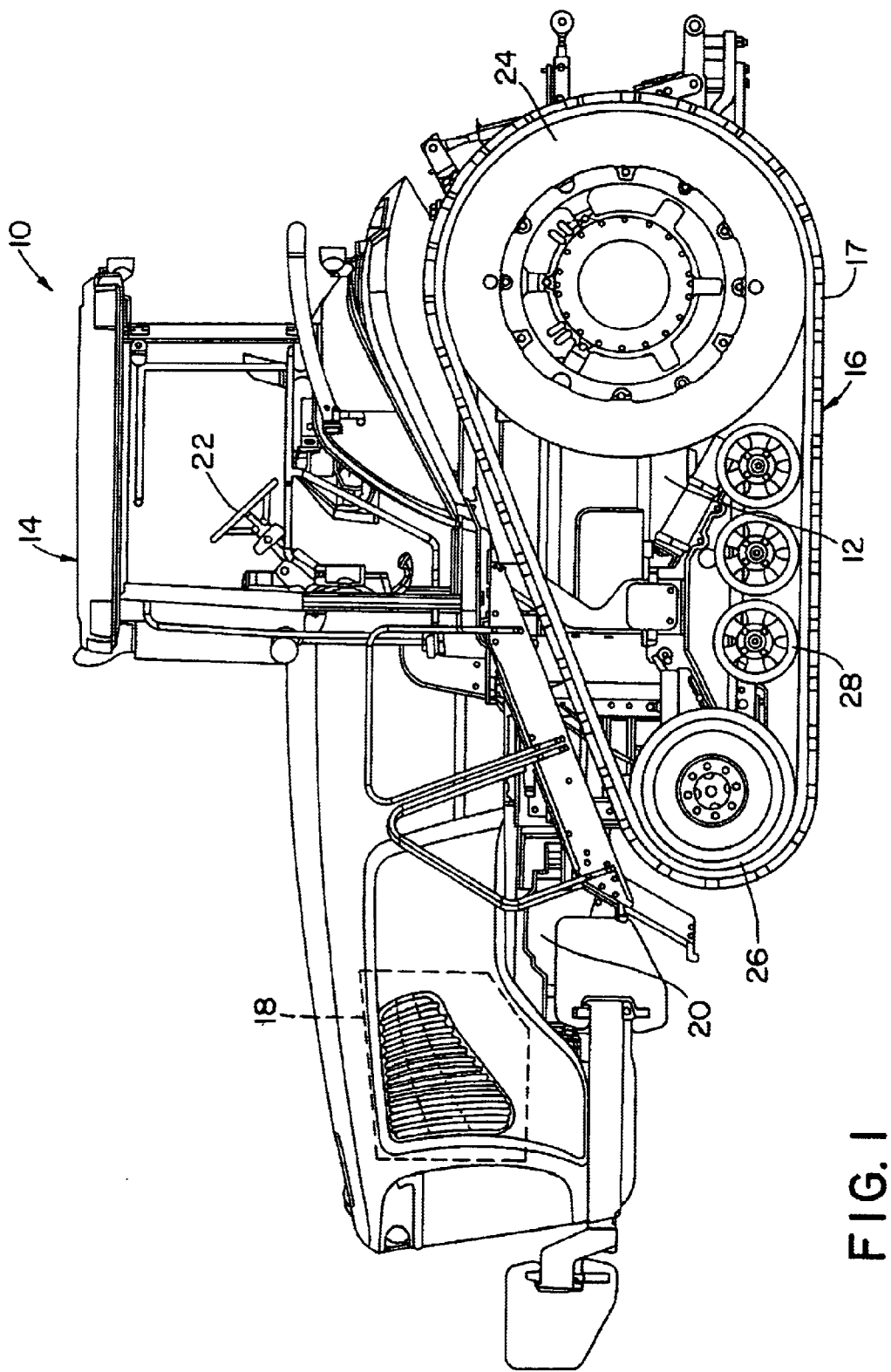
FIG. 1 shows a side pictorial view of a tracked agricultural vehicle employing the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Referring to FIG. 1, a tracked agricultural tractor 10 includes a frame 12, an operator cab 14, a track assembly 16 including a track 17, an engine 18, a drive train 20 which transfers power from the engine to the track assembly, and various controls 22 in the cab for controlling the driving and other operations of the tractor.

Track assembly 16, shown on the left side of the tractor, includes a drive wheel assembly 24, an idler wheel assembly 26, and mid-roller wheel assemblies 28, three of which are shown. A complementary second track assembly 16 (not shown) is located on the right side of the tractor, whereby the two track assemblies, in combination, are used to support, drive, and steer the tractor.

Drive wheel assemblies 24 are used to drive the tractor, and are typically used in steering the tractor, as well as in supporting the tractor from the ground. The drive wheel assemblies are generally more robust, larger, and more complex than either the idler wheel assemblies or the mid-roller wheel assemblies.

Idler wheel assemblies 26 are generally larger than the mid-roller wheel assemblies, in order to tolerate the steering stresses placed on the idler wheel assemblies, as well as the stresses of turning the track about an angle approaching, but typically less than, 180 degrees. Accordingly, while the idler wheel assemblies must be reasonably robust, the idler wheel assemblies do not need structure involved in driving the tractor, whereby the idler wheel assemblies can typically be less robust than the driving wheel assemblies.

Mid-roller wheel assemblies 28 are positioned between a driving wheel assembly and a respective idler wheel assembly, and support the track from the frame thus to expand the effective ground-engaging area by which the track supports the tractor from the ground, thereby to limit e.g. the ground loading, compression effected by the tractor.

Figure 2:
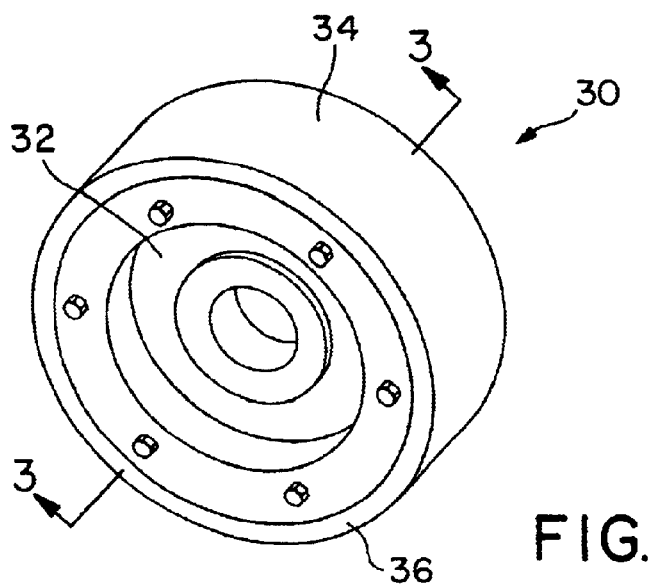
FIG. 2 shows a pictorial view of a wheel assembly used in track drive systems of the invention.
Figure 3:
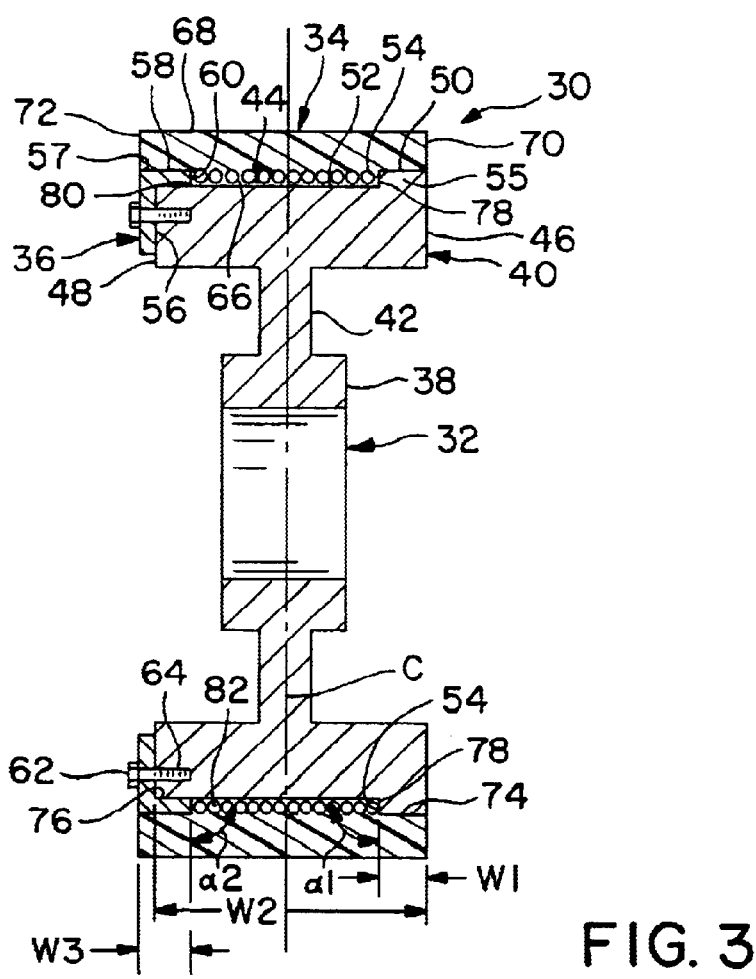
FIG. 3 shows a cross-section of a novel wheel assembly of the invention and is taken at 3-3 of FIG. 2.

Referring now to FIGS. 2 and 3, a wheel assembly 30 includes a wheel 32, a tire 34, and a retaining flange ring 36. Wheel 32 includes an inner flange 38 for interfacing with a wheel hub (not shown), an outer flange 40, and a web 42 connecting the inner flange to the outer flange.

Inner flange 38 generally defines a cylindrical opening for receiving a hub, a shaft, and the like. The inner flange configuration is generally not critical to operation of the invention whereby a wide variety of inner flange configurations can be used in the invention.

The design of web 42 is generally not critical to operation of the invention whereby web 42 can be any known design.

The structure of outer flange 40, and the structure of tire 34, are critical to the invention. As seen in FIGS. 2 and 3 collectively, outer flange 40 has an outer surface 44 which corresponds in diameter generally to the diameter of the outer surface of the wheel. The outer flange further has a right side 46 and an opposing left side 48.

Outer surface 44 includes a first greater diameter portion 50 and a second lesser diameter portion 52. According to the illustration of FIG. 3, greater diameter portion 50 extends upwardly as an extension of right side 46, and to the left from the distal edge of side 46, thus to define a portion of the outer surface 44 of the outer flange. The greater diameter portion 50 has a first width "W1" which extends along less than 40 percent of a second overall width "W2" of the outer surface of outer flange 40, and thus along less than 40 percent of the width of wheel 32. Typically, the greater diameter portion 50 extends along about 10 percent to about 30 percent, preferably about 20 percent to about 25 percent, of the width of the wheel. Correspondingly, the lesser diameter portion of the outer surface generally comprises at least 60 percent, up to about 90 percent of the width "W2" of the outer surface, preferably about 70 to about 80 percent, including about 75 percent, of the outer surface.

At the left edge of greater diameter portion 50, the outer surface of the outer flange extends downwardly to the lesser diameter portion, at a perpendicular angle "α1" to the lesser diameter portion, thus to form an abutment surface 54, a leg of the angle being disposed between the abutment surface and the center of the outer surface of the outer flange, thus defining abutment surface 54 for interfacing with tire 34 as discussed further hereinafter. The above-described structure of the greater diameter portion of the outer surface effectively defines a first side flange 55 which is integral with the outer flange, wherein the side flange is in part defined by the side surface of the outer flange and is in part defined by the outer surface of the outer flange. Where desired, greater diameter portion 50 can include greater and/or lesser diameter portions along the width between abutment surface 54 and side 46. Such variations are generally diameters greater than the nominal diameter of lesser diameter portion 52.

The lower portion of abutment surface 54 intersects lesser diameter portion 52 of outer surface 44. Lesser diameter portion 52 extends from abutment surface 54 toward left side 48 of outer flange 40. In the embodiment shown, the lesser diameter portion has a constant diameter, and extends uninterrupted to side 48. Where desired, lesser diameter portion 52 can include greater and/or lesser diameter portions along the width between abutment surface 54 and side 48. Such variations are diameters less than the nominal diameter of greater diameter portion 50.

As illustrated in FIG. 3, retaining flange ring 36 has an annular first side leg 56 in surface-to-surface contact with side 48 of the outer flange of wheel 32, and a second annular top leg 58 extending perpendicular to the upper edge of side leg 56 and toward a central region of outer surface 44. Top leg 58 terminates at a second abutment surface 60 which abutment surface extends at a perpendicular angle "α2" to the lesser diameter portion, a leg of the angle being disposed between the abutment surface and the center of the outer surface of the outer flange.

Considering the structure disclosed, and in order to provide a symmetrical mount for tire 34, considering the thickness of side leg 56, the outer flange has a relatively greater width between center-line "C," which extends through and is centered along the web perpendicular to the lesser diameter portion, and side 46 of the outer flange, and a relatively lesser width between the center-line and second side 48. The difference between the greater width and the lesser width is made up by the thickness of leg 56, whereby the underlying support surface provided to the inner surface and recesses of tire 34 represent a symmetrical underlying support to tire 34.

Retaining flange ring 36 is mounted to side 48 of outer flange 40 by a plurality of bolts 62 which extend into blind threaded apertures 64 in side 48 of the outer flange. While apertures 64 can extend entirely through outer flange 40 to side 46, such is not necessary as suitable securement can be achieved by the blind threaded apertures shown. Similarly, it is noted that since no fasteners pass through the tire, no fastener material, e.g. sleeves or the like, need be molded into the tire to facilitate mounting the tire to the wheel. Correspondingly, the tire is free from fasteners passing through the tire for affixation of the tire to the wheel.

Retaining flange ring 36 thus, as a separate and distinct element, defines a second side flange 57 at top leg 58, adjacent the outer surface of the outer flange of wheel 32, and opposite the first flange 55 defined at greater diameter portion 50. The length of top leg 58 of the second side flange defines a width "W3" of the second side flange. Preferably, widths "W1" and "W3" of the first and second side flanges represent a common dimension, thereby to present a symmetrical composite surface to tire 34.

Referring especially to FIG. 3, tire 34 is a non-pneumatic, unitary article. The tire has an exterior which defines an inner surface 66, an outer surface 68, first side surface 70, second side surface 72, and first and second recesses 74 and 76 extending inwardly of the tire between the inner surface and respective ones of the side surfaces. In the illustrated embodiments, and as preferred, the outer surface of the tire defines the entirety of the outer surface of the wheel assembly.

Recesses 74 and 76 in tire 34 define respective side-facing surfaces 78, 80 which interface with abutment surfaces 54, 60 of the side flanges. Such interfacing of the side-facing surfaces of the tire and the abutment surfaces of the wheel stabilizes the tire against transverse movement with respect to the wheel.

A plurality of cables 82, such as steel cables, nylon cables, or polyester cables, are embedded in, molded into, tire 34 adjacent inner surface 66 of the tire. Such cables can represent single or multiple strand cable material, woven cable elements and/or nonwoven e.g. randomly formed webs of cable material.

Elongation properties of cables 82 are such as to limit expansion of the diameter of the tire at inner surface 66. The diameter of the cable material is sufficiently small that the longitudinal axis of the cable is below the tops of the side flanges, such that retention action of the side flanges acts outwardly, in the wheel assembly, of the center of mass of the cables, whereby the cooperative interaction between the side flanges and the tire, in combination, tends to urge the cables toward the outer surface of the wheel. In accord with such interface, the inner surface of the tire is discouraged from expanding to the outer diameter limits of the side flanges, whereby the side flanges are effective to retain the tire transversely stable on wheel 34. To that end, preferred cable material can be selected from among those materials known for use in tires. Steel cables are preferred.

Overall, the stretching capabilities of the tire elastomeric material and the limited stretching properties of the cables, in combination, are effective to prevent the tire from stretching radially so as to increase the diameter at the inner surface enough to enable the tire to translate transversely over one of the side flanges and thus off the wheel.

In the context of retaining the tire transversely stable on wheel 34, the magnitudes of angles "α1" and "2" can be as small as about 45 degrees up to as great as about 135 degrees. Below 45 degrees, the wearability of the interface can tend to be limited. At greater than 135 degrees, the abutment interfaces can enable the tire to slip up and over one of the side flanges during use of the wheel assembly.

Preferred angles are between about 60 degrees and about 120 degrees. More preferred angles are about 75 degrees to about 105 degrees. The illustrated angles are 90 degrees.

In an embodiment (not shown), side surfaces of the tire and the flanges can be designed with any of a wide variety of cooperative interfacial surface structures so as to positively lock the tire to the side flange interfaces.

While adhesive can be used at the interface between the outer surface of the wheel and the inner surface of the tire, and while compatible such adhesives are well known in the art, no adhesive need be used in the invention. Indeed, adhesive is preferably not used.

Rather, securing a suitable interface between the tire and the wheel is achieved by selecting suitable cooperative diameters for the inner surface of the tire and the outer surface of the wheel as well as by selecting suitable materials for both the wheel and tire. Such suitable interfacial diameters optionally include a difference in diameter, with the diameter of the inner surface of the tire being the greater of the diameters by e.g. about −0.02 inch to about +0.04 inch. The maximum range of differences depends on the radial elongation, e.g. diameter expansion, capabilities of the tire. Where there is an interference fit, the tire is stretched appropriately when installed on the wheel and then is allowed to resiliently relax thereby to firmly grip the wheel by friction. Where there is a positive diameter difference, some modest slippage is tolerated between tire and wheel when no load, or a modest load, is being applied to the wheel assembly.

Whatever the relationships of the diameters of the tire and wheel, the critical relationship is that the tire should not be so loose as to be readily pushed off the wheel with the second side flange secured in place.

Tire 34 is mounted to wheel 32, starting with the retaining flange ring removed from the wheel. The tire is slid transversely onto the outer surface of the outer flange, from the direction of second side 48. In the process, the tire is expanded as necessary to account for and accommodate any interference in the fit between tire and wheel. The tire is slid along outer surface 44 until side facing surface 78 of the tire comes into abutting relationship with abutment surface 54 of first flange 55, whereby the first flange comes into a full, or generally full interfacial relationship with the first recess. Retaining flange ring 36 is then installed over side 48 of the outer flange such that top leg 58 of the flange ring comes into preferably full surface-to-surface engagement with second recess 76 of the tire. Bolts 62 are then installed through ring 36, fixedly securing ring 36 to wheel 34. With ring 36 thus in place and secured as the second side flange, the tire is fixedly held against transverse movement by the side flanges, and is prevented from undesirable radial expansion by cables 82.

While tire 34 is preferably not adhered to the wheel, the wheel and tire are still caused to act as a single unit when a load is applied as between the track and the wheel assembly. In such loaded environment, the radial loading applied by the track against the outer surface of the tire causes frictional engagement between the outer surface of the wheel and the inner surface of the tire. Those skilled in the art can select suitable rubber or other elastomer materials such as certain rubber or polyurethane polymers, for use in the tire body, to obtain desirable properties of resilience to e.g. cushion shocks otherwise transmitted from the ground throughout the vehicle, and friction engagement between the wheel and the tire, and between the tire and the track.

As a corollary to the above installation procedure, to replace the tire, bolts 62 are removed, flange ring 36 is removed from the side of wheel 32, the tire is slid transversely off the wheel, and a new tire is installed as discussed above.

Wheel assemblies of the invention, as described above, are well suited for use as mid-wheel rollers 28. The inventor also contemplates use of wheel assemblies of the invention as idler wheel assemblies and as tension wheel assemblies. Where the invention is used as idler wheel assemblies, leading idler wheel assemblies are contemplated, which assist in steering the tractor or other vehicle.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A wheel assembly for use in an endless track drive system, said wheel assembly comprising:
   (a) a tire comprising a tire body comprising elastomeric material, said tire body further comprising
      (i) a tire exterior, said tire exterior comprising an inner surface, an outer surface, first and second respective side surfaces extending generally from the outer surface toward the inner surface, and first and second recesses in the exterior of said tire body between the inner surface and respective ones of the side surfaces, the first and second recesses each defining a side-facing recess surface thereof; and
      (ii) a plurality of cables proximate the inner surface of said tire body, embedded in and surrounded by said elastomeric material;
   (b) a wheel comprising
      (i) an inner flange defining a central opening for mounting said wheel to an axle for rotation of said wheel on such axle,
      (ii) an outer flange having first and second opposing sides, and an outer surface corresponding to an outer surface of said wheel, the outer surface of said wheel receiving the inner surface of said tire thereon at a wheel-tire interface, the inner surface of said tire and the outer surface of said wheel being cooperatively sized and configured such that said tire can be mounted on said wheel with a snug fit,
         the outer surface of said outer flange comprising a first lesser diameter portion extending from the first side of said wheel toward the second opposing side, said lesser diameter portion having a first lesser diameter, the outer surface of said wheel further comprising a second greater diameter portion, comprising a first side flange at the second side of, and integral with, said outer flange of said wheel, said first side flange extending outwardly of the minimum diameter portion of the outer surface of said outer flange, and comprising a first abutment surface facing toward a center of the outer surface and abutting the side-facing recess surface of the first recess in the exterior of said tire, and
      (iii) a web connecting said inner flange to said outer flange said web being integral with said outer flange such that said web, said outer flange, and said side flange comprise a unitary structure; and
   (c) as a separate and distinct element, a second side flange disposed against the first side of said outer flange and comprising a second abutment surface facing toward the center of the outer surface of the outer flange, said second side flange being removably mounted to said outer flange of said wheel, the second abutment surface abutting the side-facing recess surface of the second recess in the exterior of said tire,
the lesser diameter portion of the outer surface of said outer flange having a relatively greater first width between a center line, extending through and centered along said web perpendicular to said lesser diameter portion, and a first side of the lesser diameter portion, which is disposed toward the first side of said outer flange, and a relatively lesser second width between the center line and a second side of the lesser diameter portion of the outer surface, which is disposed toward the second side of said outer flange.

2. A wheel assembly as in claim 1 wherein the cables are steel cables.

3. A wheel assembly as in claim 1, said wheel assembly comprising an outer surface thereof directed away from the axis of rotation of said wheel assembly, the outer surface of said tire being directed away from the axis of rotation of said wheel assembly, and wherein the outer surface of the tire defines the entirety of an outer surface of said wheel assembly which is directed away from the axis of rotation of said wheel assembly.

4. A wheel assembly as in claim 1, said wheel assembly tire being free from fasteners passing therethrough for affixation of said tire to said wheel.

5. A wheel assembly as in claim 1, said wheel assembly being free from adhesive at the wheel-tire interface.

6. A wheel assembly as in claim 1, said second side flange comprising an annular body having apertures therein, receiving fasteners removably affixing said annular body to the first side of said outer flange, and an annular leg extending from said annular body toward a central portion of the outer surface of said outer flange, between the outer surface of said outer flange and the inner surface of said elastomeric tire at the second recess.

7. An endless track drive system, said drive system comprising a prime mover, an endless track mounted about a plurality of wheels, and a drive train transferring drive power from the prime mover to at least one of the wheels, at least one of the plurality of-wheels comprising a wheel assembly of claim 6.

8. A tracked vehicle comprising a frame, a prime mover, a track assembly, and a drive train transferring drive power from the prime mover to the track assembly, said track assembly comprising an endless track and a plurality of wheels about which said endless track is mounted, at least one of said wheels comprising a wheel assembly of claim 6.

9. A tracked vehicle as in claim 8 wherein said wheel assembly is a mid-wheel roller.

10. A tracked vehicle as in claim 8 wherein said wheel assembly is a leading idler wheel.

11. A wheel assembly as in claim 1, the second side flange being mounted to said outer flange of said wheel by fasteners extending through apertures in said second side flange and into, and terminating in, the first side of said outer flange.

12. A wheel assembly as in claim 1, said first side edge of said wheel comprising blind apertures for receiving therein mounting bolts and thereby affixing said second side flange to said hub.

13. A wheel assembly as in claim 1, the lesser diameter portion extending along at least 60 percent of the width of said wheel between the first and second sides.

14. A wheel assembly as in claim 1, the lesser diameter portion extending along at least 80 percent of the width of said wheel between the first and second sides.

15. A wheel assembly as in claim 1, the width of the combination of the second width of the lesser diameter portion and a width of the first side flange being approximately equal to the first width of the lesser diameter portion.

16. A wheel assembly as in claim 1 wherein the elastomeric material in said elastomeric tire comprises a rubber compound.

17. A wheel assembly as in claim 1 wherein said first and second abutment surfaces form angles $\alpha$, with the lesser diameter portion of the outer surface of said outer flange, a leg of each said angle α being disposed between the respective abutment surface and the center of the outer surface of said outer flange, at an angle of no more than about 135 degrees with the respective abutment surface.

18. A wheel assembly as in claim 1 wherein said first and second abutment surfaces form angles α, with the lesser diameter portion of the outer surface of said outer flange, a leg of each said angle α being disposed between the respective abutment surface and the center of the outer surface of said outer flange, at an angle of at least about 75 degrees to 135 degrees with the respective abutment surface.

19. An endless track drive system, said drive system comprising a prime mover, an endless track mounted about a plurality of wheels, and a drive train transferring drive power from the prime mover to at least one of the wheels, at least one of the plurality of wheels comprising a wheel assembly of claim 1.

20. A tracked vehicle comprising a frame, a prime mover, a track assembly, and a drive train transferring drive power from the prime mover to the track assembly, said track assembly comprising an endless track and a plurality of wheels about which said endless track is mounted, at least one of said wheels comprising a wheel assembly of claim 1.

21. A tracked vehicle as in claim 20 wherein said wheel assembly is a mid-wheel roller.

22. A tracked vehicle as in claim 20 wherein said wheel assembly is a leading idler wheel.

23. A tracked vehicle comprising a frame, a prime mover, a track assembly, and a drive train transferring drive power from the prime mover to the track assembly, said track assembly comprising an endless track and a plurality of wheels about which said endless track is mounted, at least one of said wheels comprising a wheel assembly of claim 1.

24. A wheel assembly as in claim 1, each of said side flanges having an outer surface thereof, directed away from said outer flange of said wheel, said cables being defined by cable material having a longitudinal axis, and a diameter, the diameter of the cable material being sufficiently small that the longitudinal axis of the cable material in said tire is below the outer surfaces of the side flanges.

* * * * *